US007012744B2

(12) United States Patent
Sakaguchi

(10) Patent No.: US 7,012,744 B2
(45) Date of Patent: Mar. 14, 2006

(54) TRANSMISSIVE SCREEN AND REAR PROJECTOR

(75) Inventor: Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 38 days.

(21) Appl. No.: 10/654,967

(22) Filed: Sep. 5, 2003

(65) Prior Publication Data
US 2004/0141234 A1 Jul. 22, 2004

(30) Foreign Application Priority Data
Sep. 24, 2002 (JP) ............................. 2002-277958

(51) Int. Cl.
G03B 21/60 (2006.01)
(52) U.S. Cl. .................. 359/456; 359/455; 359/453
(58) Field of Classification Search ............ 353/72–81; 359/452–457, 460, 448, 459; 348/786, 787, 348/789, 804, 834, 835, 841, 842
See application file for complete search history.

(56) References Cited

U.S. PATENT DOCUMENTS

| 4,743,090 A * | 5/1988 | Reidinger ................. 385/120 |
| 5,439,621 A * | 8/1995 | Hoopman .................. 264/2.5 |
| 5,626,410 A * | 5/1997 | Chambers et al. ............ 353/94 |
| 5,781,342 A * | 7/1998 | Hannon et al. ............. 359/599 |
| 6,317,263 B1 | 11/2001 | Moshrefzadeh et al. .... 359/443 |
| 6,327,083 B1 * | 12/2001 | Goldenberg et al. ........ 359/453 |
| 6,421,181 B1 * | 7/2002 | Yoshida et al. ............. 359/619 |
| 6,519,400 B1 * | 2/2003 | Biscardi et al. ............. 385/120 |
| 6,567,586 B1 * | 5/2003 | Brophy et al. ............... 385/33 |
| 6,637,888 B1 * | 10/2003 | Haven ........................ 353/31 |
| 6,751,019 B1 * | 6/2004 | DeSanto et al. ............ 359/460 |
| 6,846,098 B1 * | 1/2005 | Bourdelais et al. ......... 362/330 |
| 2003/0156329 A1 * | 8/2003 | Wilkinson .................. 359/614 |
| 2004/0028370 A1 * | 2/2004 | Bourdelais et al. ......... 385/145 |

FOREIGN PATENT DOCUMENTS

| EP | 0 294 122 A1 | 12/1988 |
| EP | 0 357 070 A2 | 3/1990 |
| JP | A-61-241741 | 10/1986 |
| JP | A-7-219055 | 8/1995 |
| JP | A-8-220519 | 8/1996 |
| JP | A-8-254757 | 10/1996 |
| JP | A-2000-131506 | 5/2000 |
| WO | WO 99/13642 | 3/1999 |
| WO | WO 02/06865 A2 | 1/2002 |

* cited by examiner

Primary Examiner—Judy Nguyen
Assistant Examiner—Andrew Sever
(74) Attorney, Agent, or Firm—Oliff & Berridge, PLC

(57) ABSTRACT

The invention provides a transmissive screen having low occurrence of light diffraction and moire-fringing. The invention also provides a rear projector including such a high-quality transmissive screen. A transmissive screen, applied to a rear projector, includes a light-guide plate having substantially cylindrical light-guide spaces arranged in a flat substrate, and a light-exit-angle distribution uniformizing device to make the angular distribution of the light exiting from the substantially cylindrical light-guide spaces of the light-guide plate uniform over the transmissive screen. The light-exit-angle distribution uniformizing device is provided at the light-exiting face side of the light-guide plate. The invention also provides a rear projector including such a transmissive screen.

13 Claims, 8 Drawing Sheets

TRANSMISSIVE SCREEN AND REAR PROJECTOR

BACKGROUND OF THE INVENTION

1. Field of Invention

The present invention relates to transmissive screens and rear projectors.

2. Description of Related Art

Rear projectors can be used as suitable displays for home theater monitors and large-screen television sets. Such projectors can be advantageous.

FIG. 7 illustrates an optical system of a rear projector. Referring to FIG. 7, a rear projector 12 has a housing 50 accommodating an optical projection unit 20 that projects an image; a light-guide mirror 30 that guides the image light projected from the optical projection unit 20; and a transmissive screen 42 on which the image light guided by the light-guide mirror 30 is projected.

The transmissive screen 42 applied to this type of rear projector 12 is particularly required to have a wide viewing angle. Japanese Unexamined Patent Application Publication No. 2000-131506 discloses a transmissive screen with such a wide viewing angle. FIG. 8 is a sectional view of a transmissive screen of this type. Referring to FIG. 8, a transmissive screen 900 includes a Fresnel lens portion 910 whose light-exiting face has Fresnel lens components; a microlens array portion 920 whose light-incident face with many microlenses is disposed at the light-exiting face side of the Fresnel lens portion 910; a light shield portion 930 disposed at the light-exiting face side of the microlens array portion 920; and a diffusing sheet 940 disposed at the light-exiting face side of the light shield portion 930.

The transmissive screen 900 has an advantage in that a large vertical viewing angle due to the light refraction effect of the microlenses can be obtained.

However, the transmissive screen 900 has a problem in that light diffraction easily occurs. The transmissive screen 900 also has a problem that moire-fringing easily occurs.

SUMMARY OF THE INVENTION

The present invention provides a transmissive screen that is unlikely to cause light diffraction and moire-fringing. The invention also provides a rear projector with such a high-quality transmissive screen.

To address or solve the above, the inventors of the present invention have intensively studied and found that by employing a specific light-guide plate instead of the Fresnel lens of the related art transmissive screen, light diffraction and moire-fringing can be effectively reduced or suppressed in the transmissive screen.

(1) The transmissive screen of the present invention is applied to a rear projector. The transmissive screen includes a light-guide plate having plural substantially cylindrical light-guide spaces arranged in a flat substrate; and a light-exit-angle distribution uniformizing device to make the angular distribution of the light exiting correspondingly from the substantially cylindrical light-guide spaces of the light-guide plate uniform over the transmissive screen. The light-exit-angle distribution uniformizing device is provided at the light-exiting face side of the light-guide plate.

In comparison with the related art transmissive screen using the Fresnel lens portion, the transmissive screen of the present invention reduces or prevents moire-fringing by using the light-guide plate with substantially cylindrical light-guide spaces arranged in a flat substrate, and can effectively reduce light diffraction in the transmissive screen.

The inventors of the present invention have analyzed how moire-fringing occurs in the above-described related art transmissive screen, and have concluded that moire-fringing is caused by a regular interference pattern created when a Fresnel lens portion with Fresnel lens components arranged regularly at a certain pitch is superposed on a microlens array portion with microlenses arranged at a pitch different to that of the Fresnel lens components of the Fresnel lens portion. The inventors have also analyzed the mechanism of light diffraction in the related art transmissive screens, and have concluded that light diffraction is caused by the regular pattern of the microlenses in the microlens array portion.

When a light-guide plate with substantially cylindrical light-guide spaces arranged in a flat substrate is used in place of the Fresnel lens portion, as in the invention, since each substantially cylindrical light-guide space corresponds to each microlens, a regular interference pattern is not produced, thereby reducing or preventing moire-fringing from occurring. Furthermore, regularity of, for example, the angle or the phase of light entering the light-guide plate decreases as the light propagates through each light-guide space. For this reason, even if there exists a regular pattern, such as microlenses, at the light-exiting face side of the light-guide plate, light diffraction can be effectively reduced or suppressed.

In the transmissive screen of the present invention, the phase of the light entering the light-guide plate becomes random as the light propagates through each substantially cylindrical light-guide space. This can advantageously decrease the scintillation to reduce or suppress deterioration of contrast and picture quality. Because the Fresnel lens is not necessary, ghost images caused by internal reflection in the Fresnel lens can be reduced or prevented to further reduce or suppress the deterioration of contrast and picture quality.

The Fresnel lens portion in the related art transmissive screens serves to achieve a uniform angular distribution of transmitted light over the central and peripheral regions of the screen by collimating image light emerging from a projecting lens. Accordingly, the transmissive screen of the present invention is further provided with a light-exit-angle distribution uniformizing device as an optical component to make the angular distribution of light exiting from the substantially cylindrical light-guide spaces of the light-guide plate uniform over the screen.

The light-guide plate of the present invention may include a light-guide plate having plural optical fibers arranged in a flat substrate, a light-guide plate having plural light-guide tubes arranged in a flat substrate, or a light-guide plate having plural holes in a flat substrate to make substantially cylindrical light-guide spaces.

(2) In the transmissive screen of (1), the diameter of the light-guide spaces is preferably in the range of 1 $\mu$m to 150 $\mu$m.

The reason to set the diameter of the optical fibers at 1 $\mu$m or larger is to facilitate the arrangement of the plural light-guide spaces in the manufacturing process of the light-guide plate. From this viewpoint, the light-guide spaces more preferably have a diameter of 10 $\mu$m or more, and most preferably have a diameter of 20 $\mu$m or more. On the other hand, the diameter of the light-guide spaces is set to 150 $\mu$m or less so as to maintain a required resolution, since a decrease in resolution is caused by the excessively large diameter of the light-guide spaces compared to the size of pixels projected on the light-guide plate. From this viewpoint, the light-guide spaces more preferably have a diameter of 100 μm or less, and most preferably have a diameter of 60 μm or less.

(3) In the transmissive screen of (1) or (2), the length of the light-guide spaces is preferably equal to or greater than the diameter of the light-guide spaces, and is also preferably 10 mm or less.

The length of the light-guide spaces is set to equal to or greater than the diameter of the light-guide spaces so as to sufficiently decrease the regularity of, for example, the angle or the phase of light entering the light-guide plate as the light passes through the light-guide spaces. From this viewpoint, the length of the light-guide spaces is more preferably at least three times the diameter of the light-guide spaces, and most preferably at least ten times the diameter of the light-guide spaces. On the other hand, the length of the light-guide spaces is set to 10 mm or less so as not to attenuate light passing through the substantially cylindrical light-guide spaces, thus reducing or preventing the screen from dimming, and also so as to sufficiently reduce the cost of manufacture. From this viewpoint, the substantially cylindrical light-guide spaces more preferably have a length of 6 mm or less, and most preferably have a length of 4 mm or less.

(4) In the transmissive screen of any one of (1) to (3), the flat substrate is preferably formed of an opaque material.

Accordingly, when light is projected from the projecting lens onto the light-guide spaces, the opaque material absorbs light that does not enter the light-guide plate or that is not introduced into the light-guide spaces so as to suppress stray light and thus to reduce or suppress deterioration of contrast and picture quality of the screen due to the stray light. Furthermore, the opaque material absorbs external light and environmental light to contribute to a screen with a high contrast even in a brightly lit room.

(5) In the transmissive screen of any one of (1) to (4), the light-exit-angle distribution uniformizing device includes a microlens array having plural microlenses, each microlens being provided correspondingly to each substantially cylindrical light-guide space of the light-guide plate. The curvature radius of the microlenses in the central region of the transmissive screen are preferably smaller than the curvature radius of the microlenses in the peripheral region of the transmissive screen.

In a rear projector, among light emerging from a light-guide mirror, light entering the peripheral region of the transmissive screen has a larger incident angle than light entering the central region of the transmissive screen. For this reason, the angular distribution of light exiting from the substantially cylindrical light-guide spaces in the central region of the transmissive screen is significantly different from that of light exiting from the substantially cylindrical light-guide spaces in the peripheral region of the transmissive screen. In the present invention, therefore, a microlens array in which the curvature radius of the microlenses in the central region of the transmissive screen are smaller than the radii of curvature of the microlenses in the peripheral region of the transmissive screen is disposed at the light-exiting face side of the light-guide plate. This effectively makes the light-exit-angle distribution uniform over the central and peripheral regions of the transmissive screen, and achieves a rear projector with a desired wide viewing angle.

(6) In the transmissive screen of any one of (1) to (4), the light-exit-angle distribution uniformizing device includes a microlens array having plural microlenses, each microlens being provided correspondingly to each substantially cylindrical light-guide space of the light-guide plate. The material of the microlenses in the substantially central region of the transmissive screen preferably has a refractive index greater than at least the refractive index of the material of the microlenses in the peripheral region of the transmissive screen.

Because the refractive index of the material of the microlens is greater in the substantially central region of the transmissive screen than in the peripheral region, the disposition of the microlens array at the light-exiting face side of the light-guide plate also effectively makes the light-exit-angle distribution uniform over the central and peripheral regions of the transmissive screen, as in (5). This achieves a rear projector with a desired wide viewing angle.

(7) In the transmissive screen of (5) or (6), the microlens array is preferably disposed on the light-exiting face of the light-guide plate.

Thus, the light-guide plate and the microlens array are integrated to prevent loss by interfacial reflection, which occurs in a related art transmissive screen between the light-exiting face of the Fresnel lens portion and the light-incident face of the microlens array. A brighter transmissive screen than the related art one can thus be achieved.

(8) In the transmissive screen of (5) or (6), the light-guide plate preferably includes a light diffusing layer disposed on its light-exiting face side, and the microlens array is preferably disposed on the light-exiting face of the light diffusing layer.

Since the light diffusing layer is disposed between the light-guide plate and the microlens array, light propagating through the light-guide plate is diffused by the light diffusing layer before entering the microlens array. Although light enters the central region of the light-guide plate at a narrower angle with respect to the normal line of the plate compared with light entering the peripheral region of the light-guide plate, the light diffusing layer effectively diffuses light to enhance the uniformity of the luminance in the screen.

(9) In the transmissive screen of any one of (1) to (4), the light-exit-angle distribution uniformizing device includes a light diffusing layer. The haze value of the light diffusing layer in the substantially central region of the transmissive screen is preferably greater than at least the haze value of the light diffusing layer in the peripheral region of the transmissive screen.

By disposing the light diffusing layer at the light-exiting face side of the light-guide plate, the light diffusing layer having a greater haze value in the substantially central region of the transmissive screen than at least in the peripheral region of the transmissive screen, the light-exit-angle distribution over the central and peripheral regions of the transmissive screen is effectively uniformized, as in (5) and (6). This structure achieves a rear projector with a desired wide viewing angle.

(10) In the transmissive screen of item (9), the light diffusing layer preferably diffuses light substantially at the surface thereof.

Consequently, since effective light diffusion can be achieved regardless of the thickness of the light diffusing layer, the transmissive screen can be made thinner, and the light-exit-angle distribution over the central and peripheral regions of the transmissive screen can effectively be made uniform while maintaining high resolution of the transmissive screen.

(11) In the transmissive screen of (9) or (10), the light diffusing layer is preferably disposed on the light-exiting face of the light-guide plate.

This facilitates the integration of the light-guide plate and the light diffusing layer to reduce or prevent loss by interfacial reflection between the light-exiting face of the light-guide plate and the light-incident face of the light diffusing layer. A brighter transmissive screen than the related art one can thus be achieved.

(12) In the transmissive screen of any one of (9) to (11), the light diffusing layer preferably has a haze value in the range of 5% to 90%.

Because a uniform diffusion of light exiting from the light-guide plate is difficult when using a light diffusing layer with a haze value of 5% or less, the haze value of the light diffusing layer is set to 5% or more. From this viewpoint, the haze value of the light diffusing layer is more preferably 20% or more, and most preferably 50% or more. On the other hand, the maximum haze value of the light diffusing layer is set to 90% or less, so as to reduce or suppress the generation of blur or defocus of the image caused by an excessively large haze value to an acceptable level. From this viewpoint, the haze value of the light diffusing layer is more preferably 83% or less, and most preferably 75% or less.

(13) In the transmissive screen of any one of (9) to (12), the light diffusing layer preferably has a gloss value in the range of 5% to 40%.

Because a uniform diffusion of light exiting from the light-guide plate is difficult when the gloss value of the light diffusing layer exceeds 40%, the gloss value of the light diffusing layer is set to 40% or less. From this viewpoint, the gloss value of the light diffusing layer is more preferably 35% or less, and most preferably 30% or less. On the other hand, the gloss value of the light diffusing layer is set to 5% or more, so as to reduce or suppress the generation of graininess and defocus of the image caused by an excessively small gloss value to an acceptable level. From this viewpoint, the gloss value of the light diffusing layer is more preferably 10% or more, and most preferably 20% or more.

(14) In the transmissive screen of any one of (9) to (13), the light diffusing layer has a rough surface with substantial conical protrusions. The height difference of the protrusions is more preferably in the range of 5 $\mu$m to 20 $\mu$m.

(15) A rear projector of the present invention includes an optical projection unit, a light-guide mirror, and a transmissive screen according to any one of (1) to (14).

Accordingly, the rear projector of the present invention having a transmissive screen that does not easily cause light diffraction and moire-fringing can display high-quality images without light diffraction and moire-fringing.

DETAILED DESCRIPTION OF PREFERRED EMBODIMENTS

Exemplary embodiments of the present invention are described below with reference to the drawings.

First Exemplary Embodiment

Figure 1:
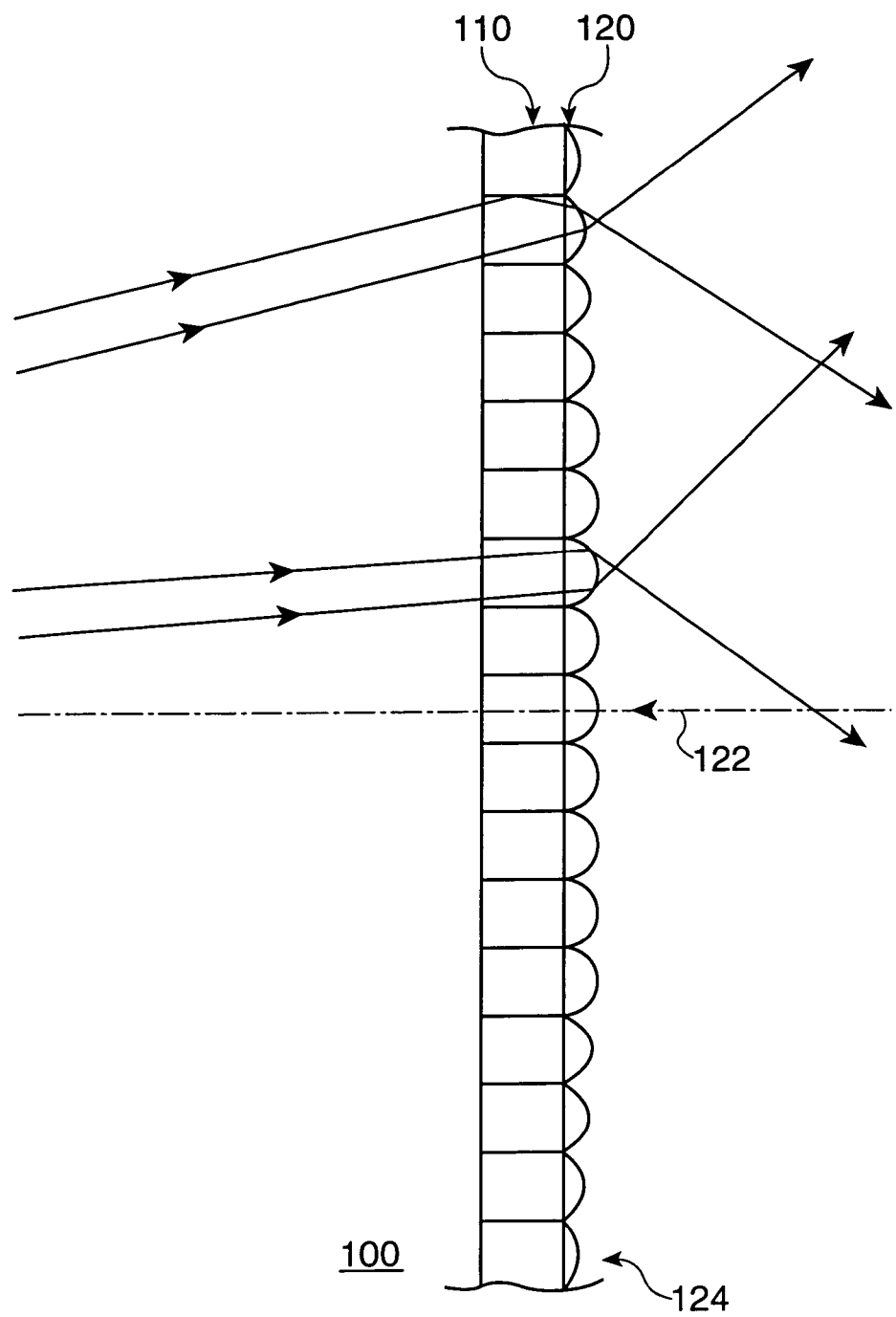
FIG. 1 is a schematic that illustrates an optical system of a transmissive screen according to a first exemplary embodiment of the present invention.
Figure 2:
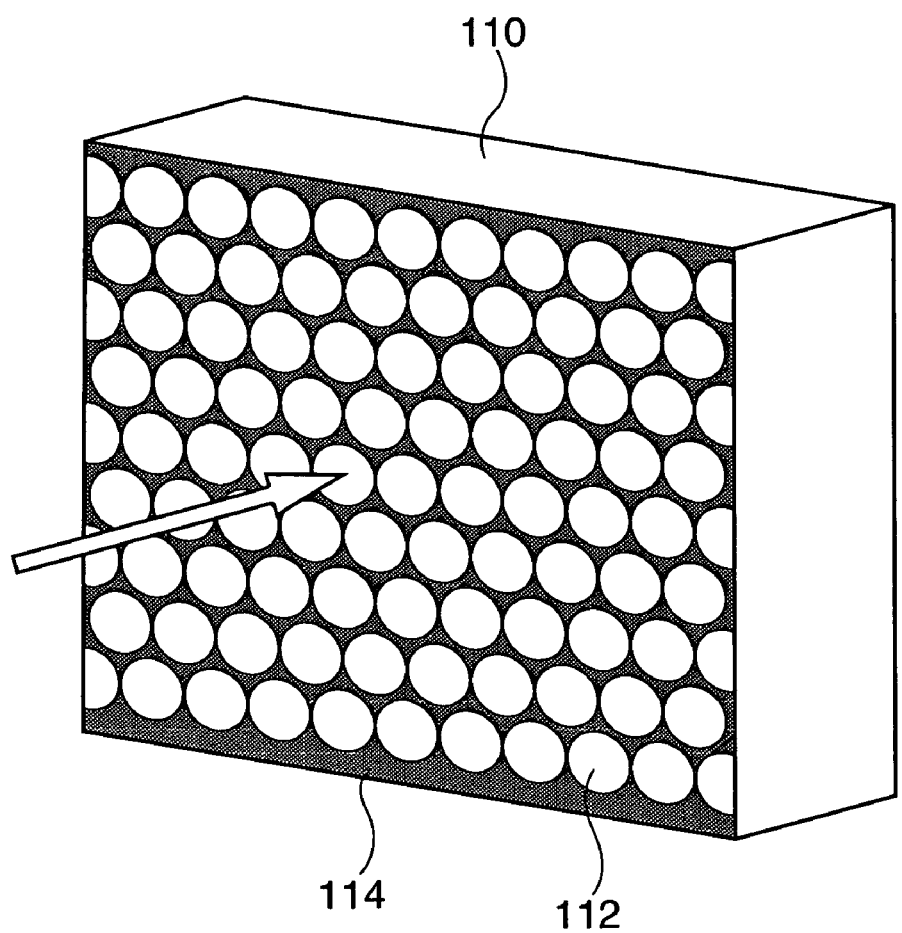
FIG. 2 is a perspective view of substantially cylindrical light-guide spaces composing a part of the transmissive screen according to the first exemplary embodiment.

A transmissive screen according to a first exemplary embodiment is applied to rear projectors. FIG. 1 illustrates an optical system of the transmissive screen according to the first exemplary embodiment. FIG. 2 is a perspective view of a light-guide plate, which is a component of the transmissive screen according to the first exemplary embodiment. Referring to FIGS. 1 and 2, the transmissive screen 100 includes a light-guide plate 110 having plural optical fibers 112 which function as substantially cylindrical light-guide spaces; and a microlens array 120 disposed at the light-exiting face side of the light-guide plate 110, the microlens array 120 functioning as a light-exit-angle distribution uniformizing device to make the angular distribution of light exiting from the light-guide plate 110 uniform over the entire screen.

The microlens array 120 includes plural microlenses, each of which corresponds to each of the optical fibers 112 in the light-guide plate 110. The curvature radius of the microlenses gradually increase from the central region of the transmissive screen 100 to the peripheral region of the transmissive screen 100. In other words, a microlens 122 in the central region of the screen 100 has a smaller curvature radius than at least a microlens 124 in the peripheral region of the screen 100.

Accordingly, the angular distribution of exiting light effectively becomes uniform over the central and the peripheral regions of the transmissive screen 100 by disposing the microlens array 120 at the light-exiting face side of the light-guide plate 110. Thus, a rear projector with a desired wide viewing angle is achieved.

In the transmissive screen 100 of the first exemplary embodiment, the light-guide plate 110 is used in place of a Fresnel lens portion 910 in a related art transmissive screen 900. Because regularity of, for example, the angle or the phase of light entering the light-guide plate 110 decreases as the light propagates through each optical fiber 112, light diffraction can be effectively reduced or suppressed even if there exists a regular pattern, such as the microlens array, at the light-exiting face side of the light-guide plate.

In the transmissive screen 100 of the first exemplary embodiment, the phase of the light entering the light-guide plate 110 becomes random as the light propagates through each optical fiber. This advantageously decreases the scintillation to efficiently reduce or suppress deterioration of contrast and picture quality caused by the scintillation. Furthermore, because the Fresnel lens is not necessary, the deterioration of contrast and picture quality due to ghost images caused by internal reflection in the Fresnel lens can also be advantageously reduced or suppressed.

In the transmissive screen 100, the diameter of the optical fibers 112 is set at 80 $\mu$m. This achieves a satisfactory resolution for the transmissive screen and also simplifies the manufacturing process of the transmissive screen.

In the transmissive screen 100, the length of the optical fibers 112 is set at 2 mm. In other words, the thickness of the light-guide plate 110 is 2 mm. This satisfactorily lowers the regularity of, for example, the angle or the phase of light entering the light-guide plate 110 as the light propagates through the optical fibers 112, thereby effectively reducing or suppressing light diffraction.

In the transmissive screen 100, the light-guide plate 110 includes opaque material 114 filled in spaces between adjacent optical fibers 112. When light is projected from a projecting lens onto the light-guide plate 110, the opaque material 114 absorbs light that does not enter the light-guide spaces or that is not introduced into the light-guide spaces so as to reduce or suppress stray light and deterioration of contrast and picture quality of the screen caused by the stray light.

In the transmissive screen 100 of the first exemplary embodiment, the light-guide plate 110 and the microlens array 120 are integrated to reduce or prevent loss by interfacial reflection, which occurs in a related art transmissive screen between the light-exiting face of the Fresnel lens and the light-incident face of the microlens array. A brighter transmissive screen than the related art one can thus be achieved.

Second Exemplary Embodiment

Figure 3:
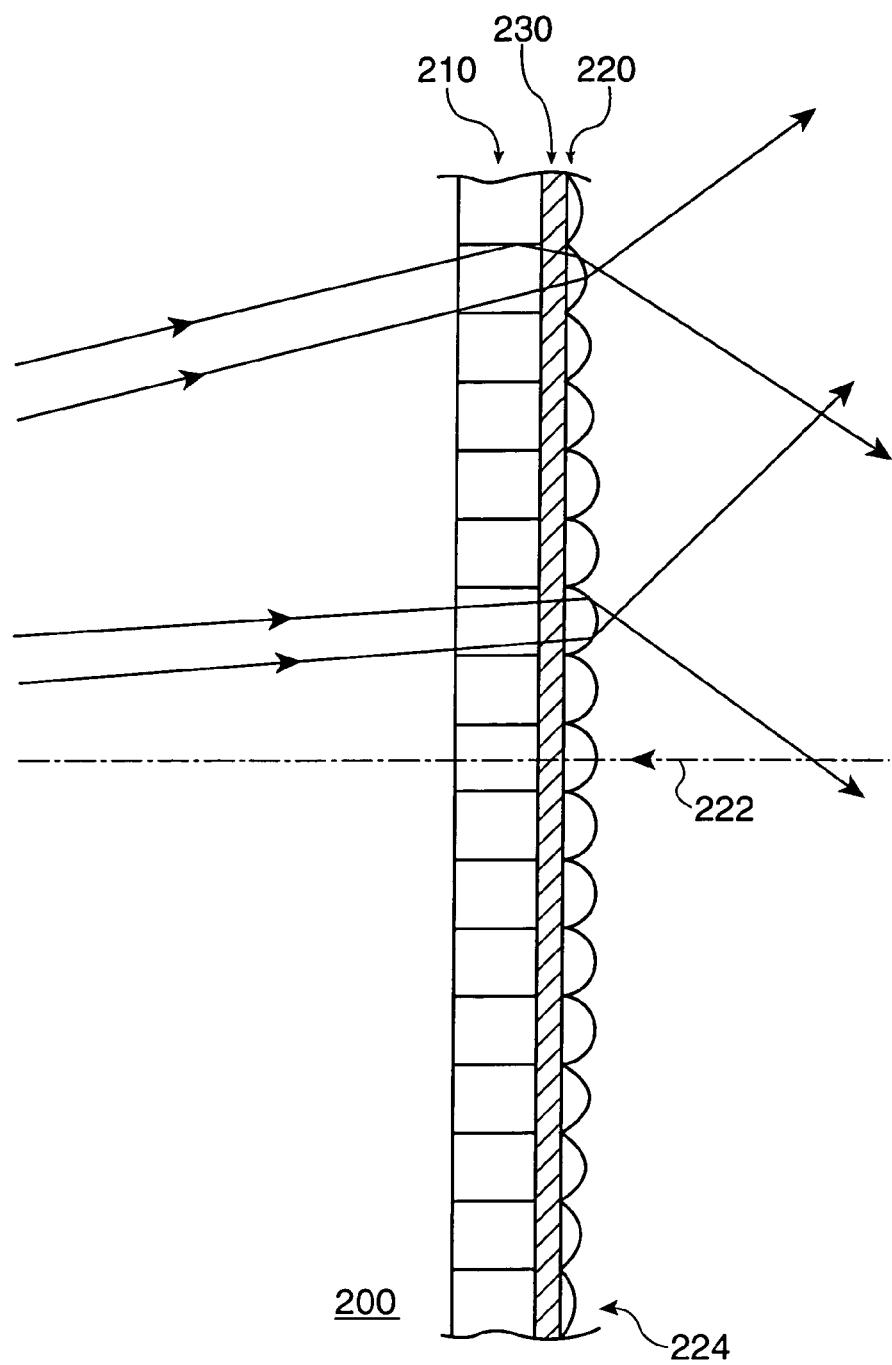
FIG. 3 is a schematic that illustrates an optical system of a transmissive screen of a second exemplary embodiment according to the present invention.

FIG. 3 illustrates an optical system of a transmissive screen according to a second exemplary embodiment. Referring to FIG. 3, a transmissive screen 200 of the second exemplary embodiment differs from the transmissive screen 100 of the first exemplary embodiment in having a light diffusing layer 230. In other words, the transmissive screen 100 of the first exemplary embodiment has the microlens array 120 disposed on the light-exiting face of the light-guide plate 110, whereas the transmissive screen 200 of the second exemplary embodiment has the light diffusing layer 230 disposed solely in the central region of the light-exiting face of a light-guide plate 210, and the microlens array 220 is also disposed over the light diffusing layer 230.

In the transmissive screen 200 of the second exemplary embodiment, light propagating through the light-guide plate 210 is diffused by the light diffusing layer 230 before entering the microlens array 220. Thus, light entering the central region of the microlens array at a shallow angle is diffused to achieve a uniform brightness of the screen.

Third Exemplary Embodiment

Figure 4:
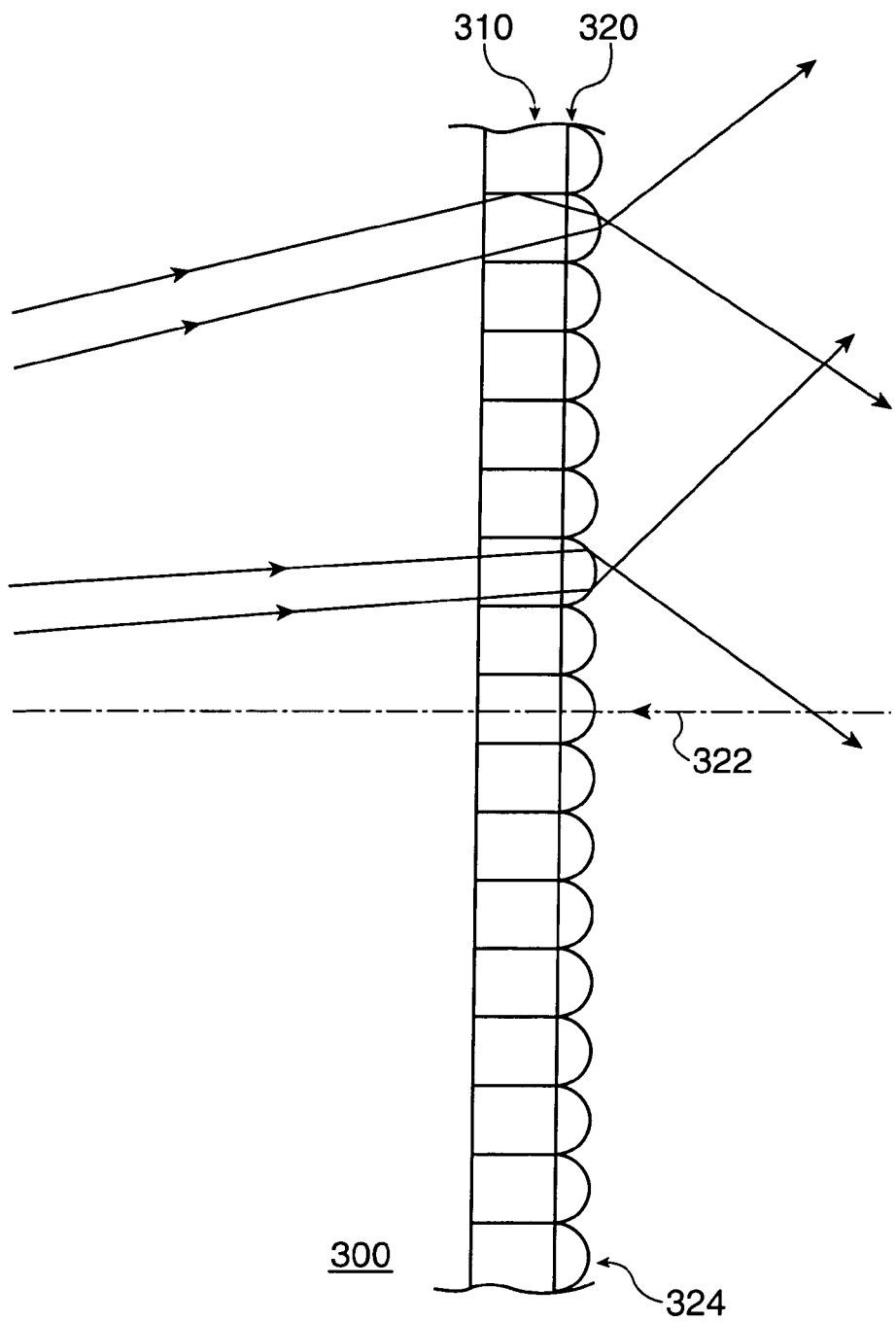
FIG. 4 is a schematic that illustrates an optical system of a transmissive screen of a third exemplary embodiment according to the present invention.

FIG. 4 illustrates an optical system of a transmissive screen according to a third exemplary embodiment. Referring to FIG. 4, the transmissive screen of the third exemplary embodiment differs from the transmissive screen of the first exemplary embodiment in the structure of the microlens array. In the transmissive screen 100 of the first exemplary embodiment, the curvature radius of the microlenses in the microlens array gradually increase from the central region of the transmissive screen 100 to the peripheral region of the transmissive screen 100. In other words, a microlens in the central region of the screen has a smaller curvature radius than at least a microlens in the peripheral region of the screen. On the other hand, in the transmissive screen 300 of the third exemplary embodiment, a microlens array 320 has the same curvature for all microlenses, but is composed of materials with different refractive indices so that the refractive index of the materials gradually decreases from the central region of the transmissive screen to the peripheral region of the transmissive screen. In other words, the refractive index of material of the microlenses in the central region of the transmissive screen is greater than the refractive index of material of the microlenses in the peripheral region of the transmissive screen.

Thus, the microlens array 320 achieves a uniform angular distribution of light emerging from the light-guide plate over the screen, as in the microlens array 120. As a result, the light-exit-angle distribution over the central and peripheral regions of the transmissive screen 300 of the third exemplary embodiment effectively becomes uniform, as in the first exemplary embodiment, to achieve a rear projector with a desired wide viewing angle.

Fourth Exemplary Embodiment

Figure 5:
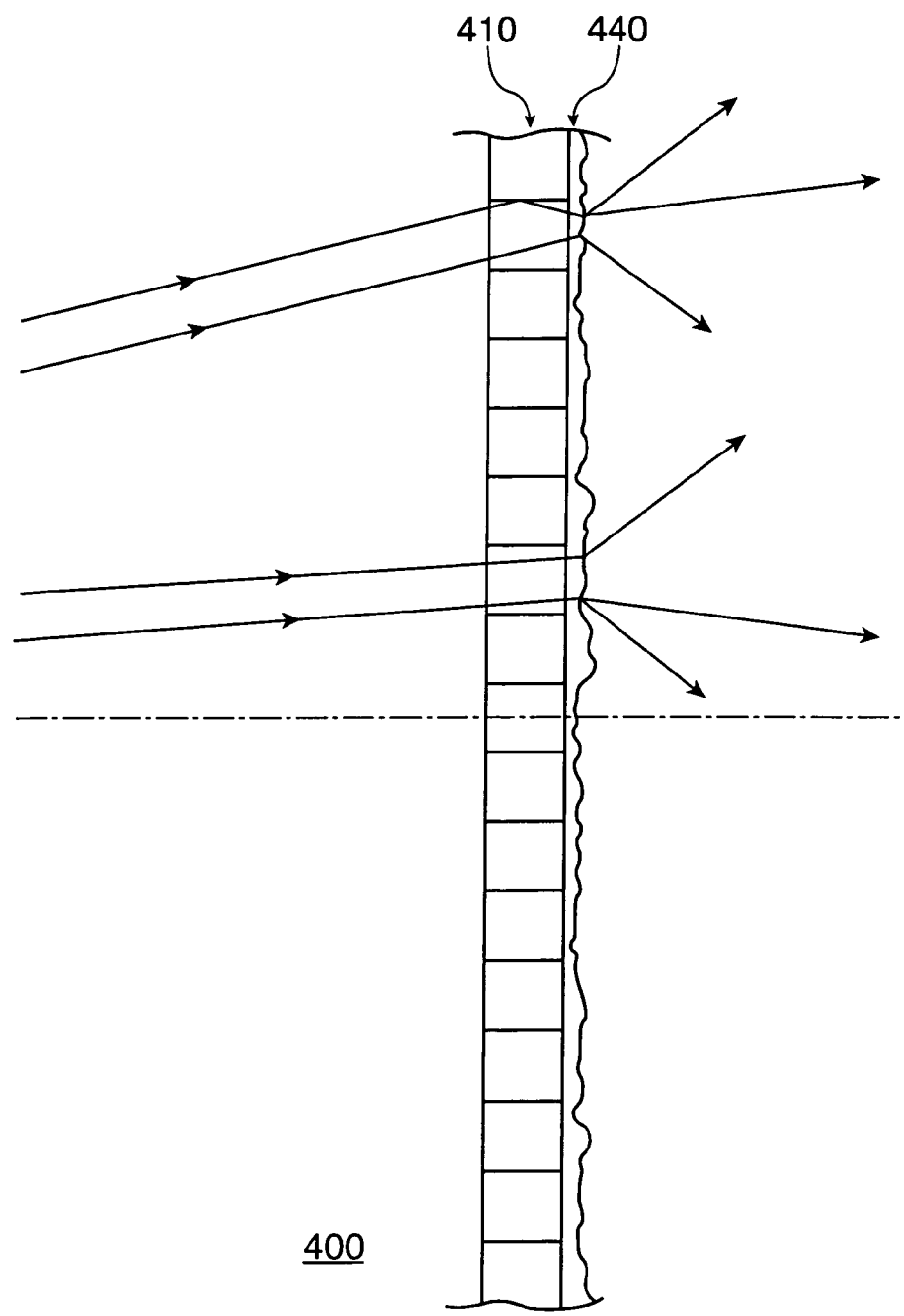
FIG. 5 is a schematic that illustrates an optical system of a transmissive screen of a fourth exemplary embodiment according to the present invention.

FIG. 5 illustrates an optical system of the transmissive screen according to a fourth exemplary embodiment. Referring to FIG. 5, the transmissive screen 400 of the fourth exemplary embodiment is provided with a light diffusing layer 440 in place of the microlens array 120 in the transmissive screen 100 according to the first exemplary embodiment. In this light diffusing layer 440, the haze value gradually decreases from the central region of the screen to the peripheral region of the screen. In other words, the haze value of the light diffusing layer 440 in the substantially central region of the transmissive screen 400 is greater than at least the haze value in the peripheral region of the transmissive screen 400.

Thus, the light diffusing layer 440 also achieves a uniform angular distribution of light exiting from the light-guide plate over the screen, as in the microlens array 120. As a result, the light-exit-angle distribution in the central and peripheral regions of the transmissive screen 400 of the fourth exemplary embodiment effectively becomes uniform, as in the transmissive screens 100, 200, and 300 of the respective first, second, and third exemplary embodiments, thereby achieving a rear projector with a desired wide viewing angle.

In the transmissive screen 400 of the fourth exemplary embodiment, the light diffusing layer 440 has a haze value of 60% in the central region of the screen and a haze value of 30% in the peripheral region of the screen.

In the transmissive screen 400 of the fourth exemplary embodiment, the light diffusing layer 440 has a gloss value of 15% in the central region of the screen and a gloss value of 30% in the peripheral region of the screen.

The transmissive screen of the present invention is described above with reference to the transmissive screens 100, 200, 300, and 400 of the respective first, second, third, and fourth exemplary embodiments. However, the transmissive screen of the present invention is not limited to these exemplary embodiments, and modifications are permissible within the scope and spirit of the present invention. For example, the transmissive screen may further include blackstripes or a light diffusing plate at the light-exiting face side of the microlens array 120, 220, or 320.

Fifth Exemplary Embodiment

Figure 6:
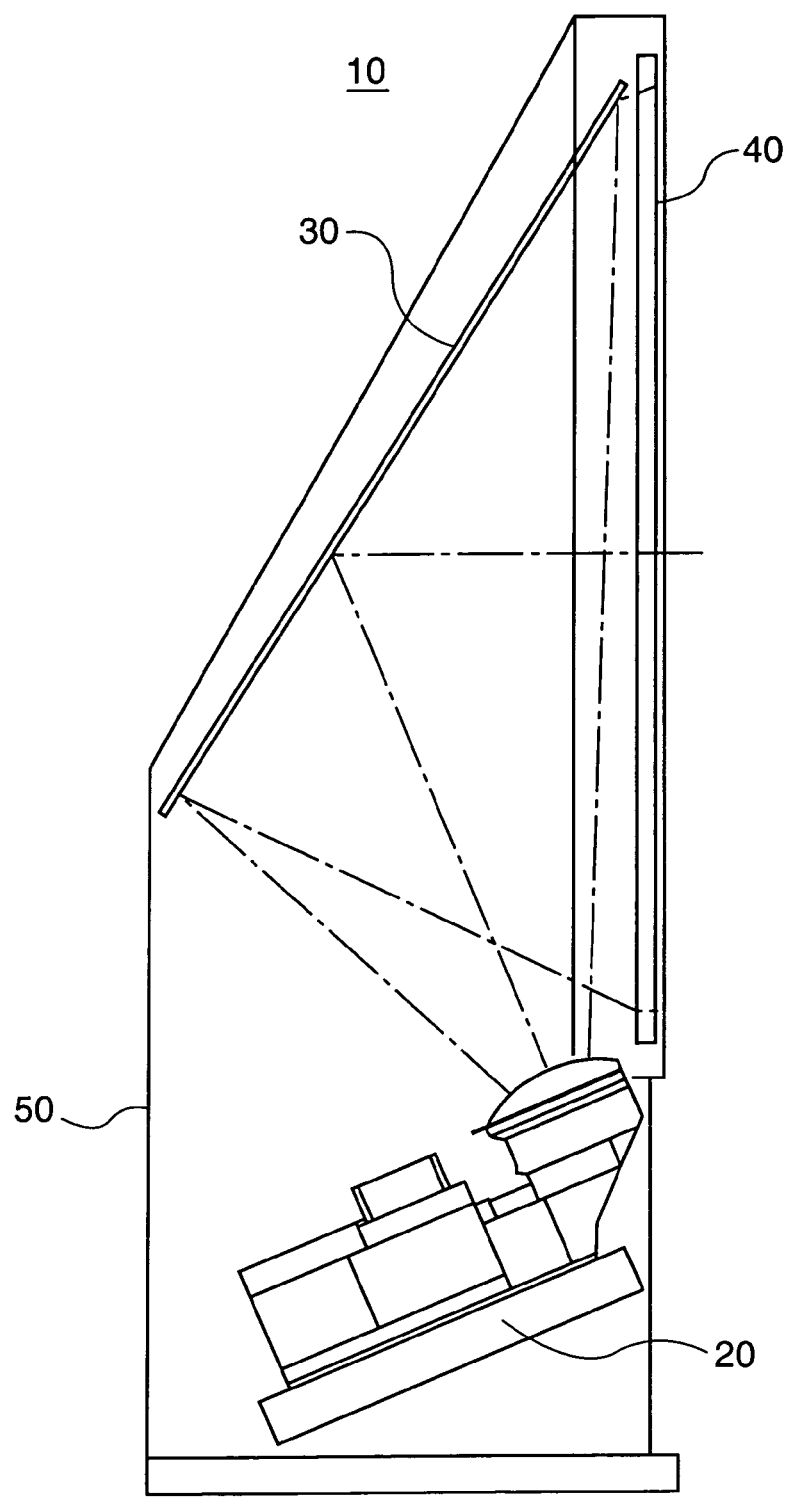
FIG. 6 is a schematic that illustrates an optical system of a rear projector of a fifth exemplary embodiment according to the present invention.
Figure 7:
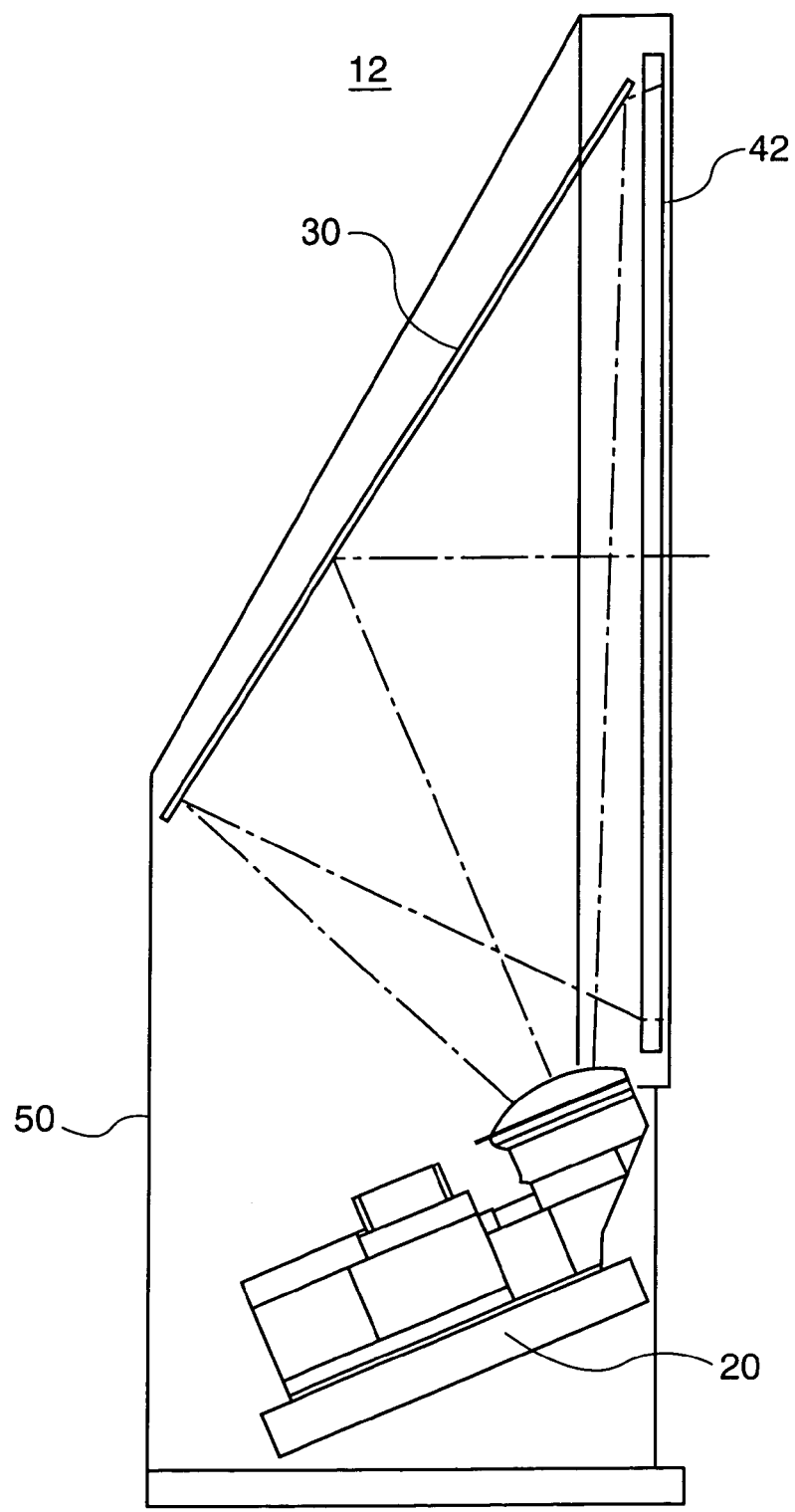
FIG. 7 is a schematic that illustrates an optical system of a related art rear projector.
Figure 8:
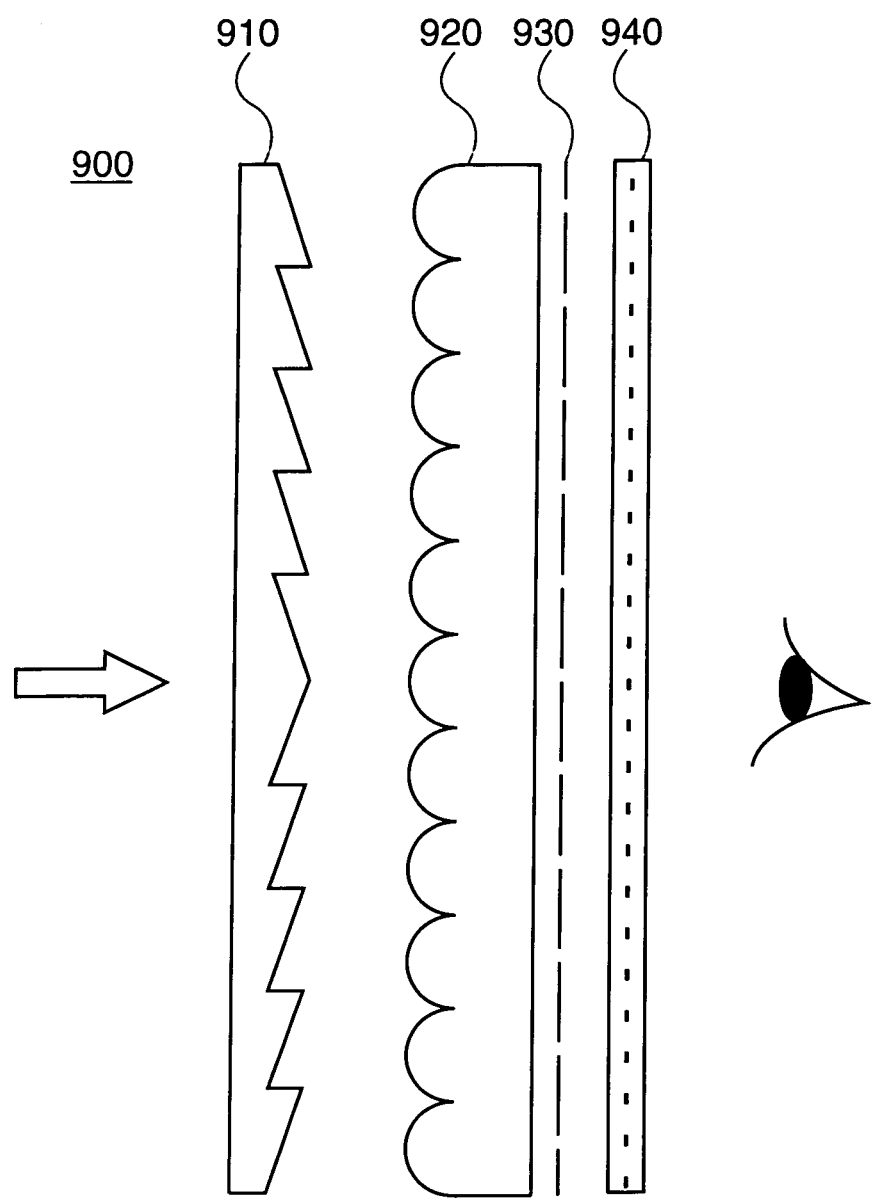
FIG. 8 is a sectional view of the structure of the related art transmissive screen.

FIG. 6 illustrates a rear projector of a fifth exemplary embodiment according to the present invention. Referring to FIG. 6, a rear projector 10 of the fifth exemplary embodiment includes a housing 50 accommodating an optical projection unit 20; a light-guide mirror 30; and a transmissive screen 40.

In this rear projector 10, the transmissive screen 40 is any one of the transmissive screens 100, 200, 300, and 400 of the first, second, third, and fourth exemplary embodiments having low occurrence of light diffraction and moire-fringing. Thus, the rear projector does not cause light diffraction and moire-fringing and can display high-quality images.

In each of the above-mentioned exemplary embodiments, a light-guide plate having plural optical fibers arranged in a flat substrate is used. Alternatively, a light-guide plate having plural light-guide tubes arranged in a flat substrate may be used in place of the optical fibers. Another alternative is to use a light-guide plate having plural holes in a flat substrate to form substantially cylindrical light-guide spaces, thereby contributing to a lightweight structure as well as simplifying the manufacturing process.

What is claimed is:

1. A transmissive screen applied to a rear projector, the transmissive screen comprising:

a light-guide plate having substantially cylindrical light-guide spaces arranged in a flat substrate;

a light-exit-angle distribution uniformizing device to make the angular distribution of the light exiting correspondingly from the substantially cylindrical light-guide spaces of the light-guide plate uniform over the transmissive screen, the light-exit-angle distribution uniformizing device being disposed at the light-exiting face side of the light-guide plate, and wherein the light-exit-angle distribution uniformizing device includes a microlens array having microlenses, each microlens being provided correspondingly to each of the substantially cylindrical light-guide spaces of the light-guide plate, and wherein a material composing the microlenses in a substantially central region of the transmissive screen has a greater refractive index than at least a second material composing the microlenses in a peripheral region of the transmissive screen.

2. The transmissive screen according to claim 1, the light-guide spaces having a diameter in the range of 1 $\mu$m to 150 $\mu$m.

3. The transmissive screen according to claim 1, the light-guide spaces having a length greater than the diameter of the light-guide spaces, and having a length of 10 mm or less.

4. The transmissive screen according to claim 1, the flat substrate including an opaque material.

5. The transmissive screen according to claim 1, the microlens array being disposed on the light-exiting face of the light-guide plate.

6. The transmissive screen according to claim 1, the light-guide plate including a light diffusing layer disposed on its light-exiting face, and the microlens array being disposed on the light-exiting face of the light diffusing layer.

7. The transmissive screen according to claim 1, the light-exit-angle distribution uniformizing device being disposed over a light diffusing layer, the light diffusing layer in a central region of the transmissive screen having a haze value greater than at least the haze value of the light diffusing layer in a peripheral region of the transmissive screen.

8. The transmissive screen according to claim 7, the light diffusing layer diffusing light substantially at the surface thereof.

9. The transmissive screen according to claim 7, the light diffusing layer being disposed on the light-exiting face of the light-guide plate.

10. The transmissive screen according to claim 7, the light diffusing layer having a haze value in the range of 5% to 90%.

11. The transmissive screen according to claim 7, the light diffusing layer having a gloss value in the range of 5% to 40%.

12. The transmissive screen according to claim 7, the light diffusing layer having a rough surface with substantially conical protrusions.

13. A rear projector, comprising:

an optical projection unit;

a light-guide mirror; and the transmissive screen according to claim 1.

* * * * *